United States Patent [19]
Shults

[11] 3,818,625
[45] June 25, 1974

[54] TROTLINE REEL

[76] Inventor: Thomas B. Shults, 1600 Hamilton, Pampa, Tex. 79065

[22] Filed: Jan. 23, 1973

[21] Appl. No.: 325,991

[52] U.S. Cl. .............................. 43/27.4, 43/54.4 A
[51] Int. Cl. ............................................. A01k 97/06
[58] Field of Search .............. 43/54.5, 54.5 A, 57.5, 43/27.4, 8, 4, 1; 242/106

[56] References Cited
UNITED STATES PATENTS

| | | | |
|---|---|---|---|
| 2,531,816 | 11/1950 | Homoky | 43/54.5 A |
| 2,629,197 | 2/1953 | Duvall | 43/54.5 A |
| 3,022,601 | 2/1962 | Martin | 43/54.5 A |

*Primary Examiner*—Warner H. Camp
*Attorney, Agent, or Firm*—Clarence A. O'Brien; Harvey B. Jacobson

[57] ABSTRACT

Supporting and handling means for a trotline of a type provided at longitudinally spaced places with swivelly mounted leader-type staging lines. It comprises a portable stand, a substantially horizontal shaft mounted for controllable rotation on the stand and a reel or spool mounted on and for rotation with the shaft. The reel embodies a hub on which the trotline is normally wound and from which it can be progressively payed out when being used. The reel embodies a first head fixed at one end of the hub and a second head located at the other end of the hub. The second head has individual leader dividing and separating means. In addition, leader distributing and anchoring means is operatively mounted on the shaft spaced from but cooperatively aligned with the dividing and separating means. The anchoring means serves to systematically store the fishhooks on the individual leaders and assists in achieving the desired tangle-free handling of leaders.

7 Claims, 4 Drawing Figures

TROTLINE REEL

This invention relates to reels and spools which are expressly designed and adapted to support, store and handle a trotline and has to do, more particularly, with a unique reel or spool and novel support means therefor and wherein the overall structural device lends itself to feasible tangle-free handling of the staging lines or leaders which, for purposes of the instant invention, are swivelly mounted on the trotline at predetermined longitudinally spaced places.

Many and varied special purpose trotline reels and spools have been devised and offered for use in a manner to cope with perplexing and time-consuming line tangling difficulties.

For helpful and background information reference may be made to U.S. Pat. No. 2,629,197, granted to James B. Duvall. Further information can be brought to light by referring to U.S. Pat. No. 3,070,918, granted to Vance A. Sempler. Then, too, the reader, if so desired, may take into consideration U.S. Pat. No. 3,085,767, granted to Charles J. Zerbest.

Briefly the herein disclosed adaptation is characterized by a stand having means whereby the stand is capable of being readily clamped in position for use on the gunnel of a fishing boat. The stand comprises a pair of similar spaced U-shaped leg frames whose elongated bight portions are coplanar and provided with hingedly mounted C-clamps. Upwardly converging legs of the U-shaped frames are joined to peripheral edge portions of spaced parallel and aligned disc-like adapters. The adapters have hub portions provided with aligned bearings. A shaft spans the space between the respective adapters and is provided at end portions with applicable and removable sleeves. These sleeves serve as bushings and also journals and are journaled for rotation in the bearings provided therefor in the respectively coacting adapters. A hand crank for conveniently turning the shaft in either direction is mounted on one end of the shaft. A brake shoe is adjustably mounted on one of the legs of one leg frame and is frictionally engageable with the surface of one of the sleeves. The trotline reel or spool is mounted on an end portion of the shaft and the leader distributing and anchoring means is mounted on a second end portion of the shaft. The reel and anchoring means are so constructed that the swivelly mounted staging lines or leaders can be systematically stored when the trotline is retrieved and maintained in readiness for tangle-free use when the trotline is payed out for use.

An object of the invention, generally stated, is to advance the art of supporting and handling means for trotlines and, in so doing, to provide a trouble-free device which, as experience has shown, well serves the particular purposes for which it has been devised and successfully used.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
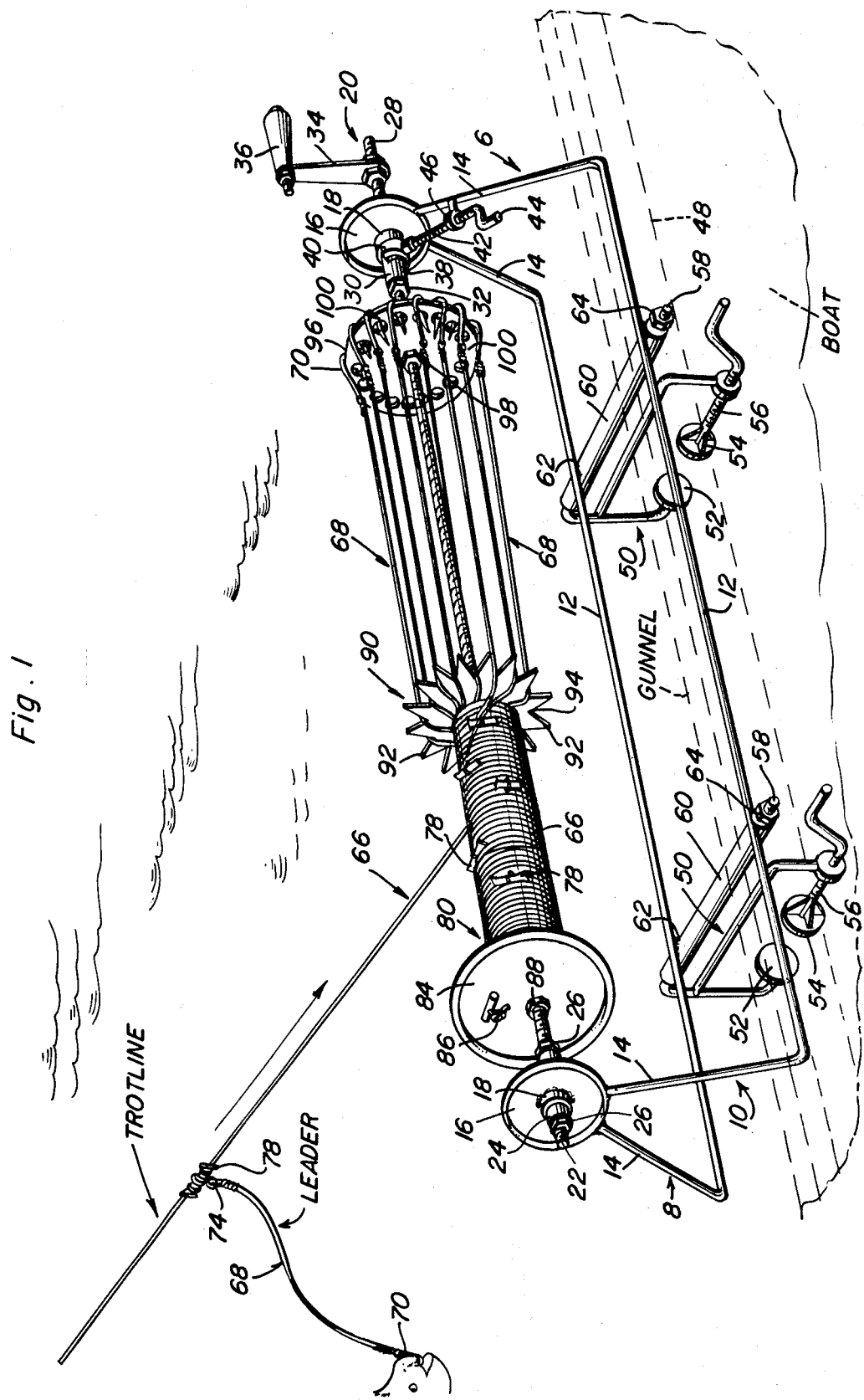
FIG. 1 is a view in perspective of a tangle-free trotline reel and stand construction constructed in accordance with the principles of the invention and showing how it is mounted and used.

With reference now to the views of the drawings and more particularly with respect to FIG. 1 it will be seen that the aforementioned horizontally elongated attachable and detachable stand is denoted, generally stated, by the numeral 6. Experience has shown that the component parts of the stand are preferably made of stout bendable but amply rigid rod stock. The stand is preferably made up of a pair of like spaced elongated U-shaped leg frames one of which is denoted at 8 and the other one at 10. Both frames are the same in construction and a description of one will suffice for both. To this end the elongated horizontal or bight portion is denoted by the numeral 12 and the upstanding legs are denoted at 14. The paired legs converge upwardly and are rigidly connected to a marginal or peripheral portion of a disc-like adapter 16. Two such adapters, one at the left and one at the right, are utilized, the central or hub portion of the adapter having a bushing which provides a satisfactory bearing at 18. These paired leg supported adapters serve to accommodatingly and rotatably support an elongated shaft denoted generally by the numeral 20. It will be observed that this shaft is screw threaded from end to end. The end portion 22 is provided with a first sleeve 24 which is threaded on the shaft and assembled and held in place by assembling and retaining nuts 26. The sleeve is such in diameter that it functions as a journal and, as a matter of fact, is journaled for rotation in the bearing 18. The other end portion 28 (FIG. 1) is likewise provided with a second threaded sleeve 30 held in place by assembling and clamping nuts 32, said sleeve also constituting a journal and being journaled for rotation in the coacting bearing 18. This end portion is also provided with a suitably tapped nut-retained hand crank 34 provided with an appropriate handgrip 36. The sleeve 30 has a projecting portion 38 which lends itself to cooperation with an appropriately lined brake shoe 40 carried by a screw-threaded actuator 42 terminating in an operating crank 44 and mounted for operation in a sleeve nut 46 bracketed on an upper end portion of the associated leg 14. Thus one end portion of the shaft can be turned with the assistance or aid of the hand crank 34 and this end portion of the shaft is regulatable by controlling action of the friction gripping brake shoe 40.

In actual practice the stand 6 is preferably but not necessarily mounted on the gunnel 48 of a fishing boat. Experience has shown that appropriate C-clamps 50 well serve the purposes desired. The clamping discs or heads are denoted at 52 and 54, the head 54 being adjustably mounted as at 56. Each C-clamp is preferably provided with a horizontal arm or limb 58 which is supported and mounted in a cylinder 60 which bridges the bight portions 12 and is welded thereto as at 62. One end portion of the arm may be screw threaded to accommodate an assembling and retaining nut as at 64.

Two C-clamps are thus hingedly mounted at spaced points on the stand. With this construction and arrangement the C-clamps can be folded to assume out-of-the-way positions when not being used (not shown).

Figure 4:
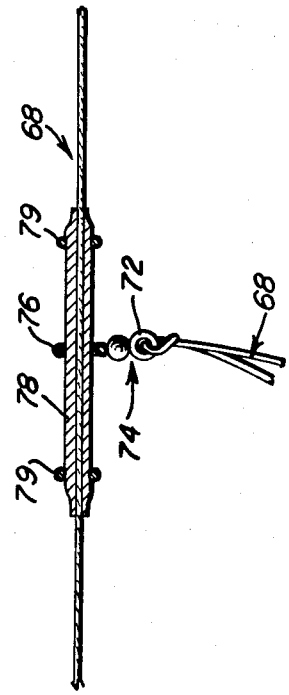
FIG. 4 is a detail view showing how each double strand leader or staging line is swively mounted and fastened in place on a predetermined portion of the trotline.
Figure 3:
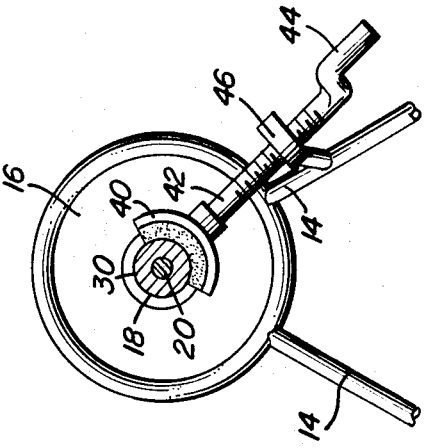
FIG. 3 is a section taken approximately on the plane of the vertical line 3—3 of FIG. 2 looking in the direction of the indicating arrows.

The aforementioned trotline is denoted, generally stated, by the numeral 66 and is of requisite length and, as is usual, is provided with a plurality of staging lines or leaders (also referred to as drop lines), only one leader being here shown. The preferred leader, denoted at 68, is preferably made up of two complemental strands provided at free end portions with an appropriately mounted fishhook 70. The strands are guidingly passed through an eye 72 of a swivel 74 secured by a shiftable collar 76 to an attaching and mounting tube 78 (FIG. 4). Guard rings 79 surround the end portions of the tube 78 and prevent the collar 76 from sliding off the tube 78. By crimping the ends of the tube 78 (as shown) slippage of the tube and displacement of rings 79 is prevented.

Figure 2:
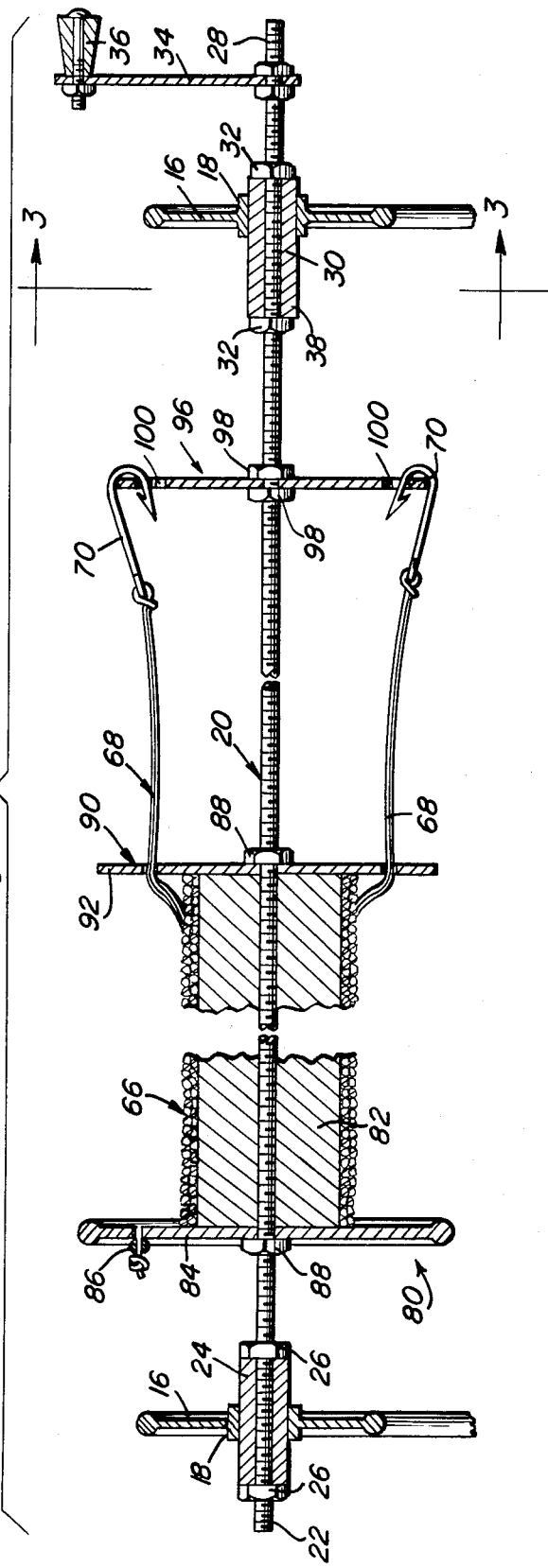
FIG. 2 is an enlarged central view of a fragmentary type which omits certain of the structural features but emphasizes the construction of the reel or spool and the leader separating and anchoring and associated structural features.

The novel spool or reel for the trotline is denoted at 80 and conprises a hub 82 (FIG. 2) on which each leader is reeled or wound in the usual manner. A first disc-like reel head is provided at 84 and provision is made thereon as at 86 for anchoring one end of the trotline. This head is held in place by an assembling and retaining nut 88. It is cooperable with the second head 90 which is serrated to provide circumferentially spaced sawtooth type teeth 92 and intervening leader receiving, equalizing and dividing seats 94. The leaders can be separated and thus systematically stored in the manner shown at the right in FIG. 1. For best results leader distributing and anchoring means is provided and comprises a disc 96 which is fastened in place on the shaft and held by assembling and retaining nuts 98. This disc is provided with circumferentially spaced holes which constitute keepers as at 100 and which serve to accommodate the aforementioned distributively arranged attachable and detachable fishhooks 70.

The manner in which the special reel 80 is constructed and performs is believed to be evident in FIG. 1. The manner in which the leaders are divided, separated and distributively stored and anchored is also believed to be evident from this view. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Supporting and handling means for a trotline provided at longitudinally spaced places with swivelly mounted leader-type staging lines comprising: a stand, a shaft mounted for rotation on said stand, a trotline reel mounted on and for rotation with said shaft, said reel embodying a hub on which the trotline is normally wound and from which it can be unwound and payed out when being used, a first head carried by one end of said hub, a second head carried by the other end of said hub, said second head having individual leader dividing and separating means, leader distributing and anchoring means operatively mounted on said shaft, oriented with said second head and designed and adapted to detachably store the fishhooks carried by free ends of the respective leaders, means carried by and for accessibly and operatively mounting said stand for angling use, means for turning said shaft, said stand comprising a pair of U-shaped leg-frames having elongated spaced parallel coplanar portions and upwardly converging ends joined to peripheral edges of aligned longitudinally spaced disc-like adapters, said adapters having axial bearings, each end portion of said shaft being provided with an applicable and removable sleeve constituting a journal, the respective journals being journaled for support and rotation in their respectively cooperable bearings.

2. Supporting and handling means for a trotline equipped at longitudinally spaced places with individual swivelly mounted leader-type staging lines comprising a portable stand, said stand comprising a pair of like elongated spaced U-shaped leg-frames having elongated parallel coplanar portions and upstanding converging legs having upper ends integrally joined to peripheral edge portions of disc-like adapters, said adapters being longitudinally spaced and having hub portions provided with aligned bearings, a shaft spanning the space between the respective adapters, said shaft being screw-threaded from end to end, applicable and removable sleeves mounted and adjustably retained on the end portions of said shaft and serving as journals and journaled for free rotation in the bearings provided therefor in said adapters, a hand crank mounted on and for turning said shaft, a brake shoe frictionally engaging one of said sleeves, means accessibly and adjustably mounting said brake shoe on a selected one of the legs of one leg frame, and a trotline reel operatively mounted on an end portion of said shaft.

3. The supporting and handling means for a trotline defined in claim 2 and wherein said reel embodies a hub on which the trotline is normally wound and from which it can be unwound and payed out when being used, a first head carried by one end of said hub, a second head carried by the other end of said hub, said second head having individual leader dividing and separating means, leader distributing and anchoring means operatively mounted on said shaft, oriented with said second head and designed and adapted to detachably store the fishhooks carried by free ends of the respective leaders, means carried by and for accessibly and operatively mounting said stand for angling use.

4. The trotline supporting and handling means defined in claim 3, and wherein said mounting means for said stand comprises C-clamps hingedly and foldably mounted on said stand and capable of being clampingly mounted on the gunnel of a fishing boat.

5. The trotline supporting and handling means defined in claim 1, and, in combination, manually regulatable brake means operatively mounted on said stand and embodying an adjustable friction brake shoe cooperatively engaging an adjacent one of said journals.

6. The trotline supporting and handling means defined in claim 1, and wherein said mounting means for said stand comprises C-clamps hingedly and foldably mounted on said stand and capable of being clampingly mounted on the gunnel of a fishing boat.

7. The trotline supporting and handling means defined in claim 1, and wherein said second head is marginally serrated, the serrations defining saw-like teeth and intervening notches and said notches providing leader receiving and separating seats, and said leader distributing and anchoring means comprising a disc which is centrally apertured and retentively mounted on said shaft, the marginal portion of said disc having circumferentially spaced keeper holes for selective anchoring of fishhooks carried by coordinating leaders.

* * * * *